United States Patent
Cui et al.

(10) Patent No.: US 11,019,677 B2
(45) Date of Patent: *May 25, 2021

(54) ADVANCED SIGNALING PROCEDURE EXCLUSION IN A NEXT GENERATION 5G NETWORK

(71) Applicant: AT&T Intellectual Property I, L.P., Atlanta, GA (US)

(72) Inventors: Zhi Cui, Sugar Hill, GA (US); Vinod Pandey, Shakopee, MN (US); Liza Fung, Edison, NJ (US); Paul Edward Smith, Jr., Rockwall, TX (US); Cheng Liu, Atlanta, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 57 days.

This patent is subject to a terminal disclaimer.

(21) Appl. No.: 16/439,560

(22) Filed: Jun. 12, 2019

(65) Prior Publication Data

US 2019/0297665 A1 Sep. 26, 2019

Related U.S. Application Data

(63) Continuation of application No. 15/899,695, filed on Feb. 20, 2018, now Pat. No. 10,362,628, which is a
(Continued)

(51) Int. Cl.
*H04W 76/28* (2018.01)
*H04W 4/70* (2018.01)
(Continued)

(52) U.S. Cl.
CPC .............. *H04W 76/28* (2018.02); *H04L 47/12* (2013.01); *H04W 4/70* (2018.02); *H04W 28/08* (2013.01);
(Continued)

(58) Field of Classification Search
CPC ........ H04L 47/12; H04W 28/08; H04W 4/70; H04W 60/06; H04W 76/10; H04W 76/28;
(Continued)

(56) References Cited

U.S. PATENT DOCUMENTS 7,853,274 B2  12/2010  Qi et al.
8,565,080 B2  10/2013  Kavanaugh et al.
(Continued)

FOREIGN PATENT DOCUMENTS

GB      2 493 722 A      2/2013
WO    2011/008498 A2    1/2011
(Continued)

OTHER PUBLICATIONS

Non-Final Office Action received for U.S. Appl. No. 14/699,725 dated Apr. 13, 2016, 19 pages.
(Continued)

*Primary Examiner* — Kashif Siddiqui
(74) *Attorney, Agent, or Firm* — Amin, Turocy & Watson, LLP

(57) ABSTRACT

When machine-to-machine (M2M) devices attach to a mobile communication network, the associated communication session can be treated differently than the attachment of other devices. For example, upon determining that a subscriber device that attaches to a communication network is an M2M device and has completed a given network transaction, the M2M device can be immediately detached without waiting on expiration of an inactivity timer. As another example, upon determining that a subscriber device that attaches to a communication network is an M2M device, the M2M device can be excluded from various signaling procedures such as load-balancing procedures.

20 Claims, 11 Drawing Sheets

Related U.S. Application Data continuation of application No. 15/355,222, filed on Nov. 18, 2016, now Pat. No. 9,936,536, which is a continuation of application No. 14/699,725, filed on Apr. 29, 2015, now Pat. No. 9,525,961.

(51) Int. Cl.

| | | |
|---|---|---|
| *H04W 76/30* | (2018.01) | |
| *H04W 76/10* | (2018.01) | |
| *H04W 60/06* | (2009.01) | |
| *H04L 12/801* | (2013.01) | |
| *H04W 28/08* | (2009.01) | |
| *H04W 76/38* | (2018.01) | |
| *H04W 8/02* | (2009.01) | |

(52) U.S. Cl.
CPC ............ *H04W 60/06* (2013.01); *H04W 76/10* (2018.02); *H04W 76/30* (2018.02); *H04W 76/38* (2018.02); *H04W 8/02* (2013.01)

(58) Field of Classification Search
CPC ........ H04W 76/30; H04W 76/38; H04W 8/02; H04W 4/005; H04W 76/02; H04W 76/06
See application file for complete search history.

(56) References Cited

U.S. PATENT DOCUMENTS

| | | | |
|---|---|---|---|
| 8,681,701 B2 | 3/2014 | Lee et al. | |
| 8,737,989 B2 | 5/2014 | Luft | |
| 8,934,470 B2 | 1/2015 | Tian et al. | |
| 9,300,473 B2 * | 3/2016 | Nix | H04L 9/3263 |
| 9,525,961 B2 * | 12/2016 | Cui | H04W 76/10 |
| 9,936,536 B2 * | 4/2018 | Cui | H04W 28/08 |
| 2010/0135255 A1 * | 6/2010 | Zhang | H04W 76/32 |
| | | | 370/331 |
| 2010/0279676 A1 | 11/2010 | Benn et al. | |
| 2011/0201365 A1 | 8/2011 | Segura | |
| 2011/0237281 A1 * | 9/2011 | Busropan | H04W 4/20 |
| | | | 455/507 |
| 2011/0256896 A1 | 10/2011 | Giaretta et al. | |
| 2012/0030358 A1 | 2/2012 | Mackenzie | |
| 2012/0178464 A1 | 7/2012 | Li et al. | |
| 2012/0220325 A1 | 8/2012 | Zhou et al. | |
| 2013/0017856 A1 | 1/2013 | Murias et al. | |
| 2013/0040678 A1 | 2/2013 | Lee et al. | |
| 2014/0006529 A1 | 1/2014 | Andreoli-fang et al. | |
| 2014/0195836 A1 | 7/2014 | Tiedemann et al. | |
| 2014/0274082 A1 | 9/2014 | Huang et al. | |
| 2014/0349660 A1 | 11/2014 | Abdalla | |
| 2014/0378101 A1 * | 12/2014 | Suh | H04W 12/02 |
| | | | 455/411 |
| 2016/0050601 A1 * | 2/2016 | Jeong | H04W 76/12 |
| | | | 455/436 |
| 2016/0262068 A1 * | 9/2016 | Won | H04W 48/02 |
| 2017/0111879 A1 * | 4/2017 | Li | H04W 60/04 |

FOREIGN PATENT DOCUMENTS

| | | |
|---|---|---|
| WO | 2011/127107 A2 | 10/2011 |
| WO | 2012/135275 A2 | 10/2012 |
| WO | 2012/141441 A2 | 10/2012 |
| WO | 2013/017178 A1 | 2/2013 |
| WO | 2013/039541 A1 | 3/2013 |
| WO | 2014/090269 A1 | 6/2014 |

OTHER PUBLICATIONS

Costa, Javier Mendonca, "Context-Aware Machine to Machine Communications in Cellular Networks", URL: http://www.diva-portal.org/smash/get/diva2:705678/FULLTEXT01.pdf., Oct. 2013, 52 pages.
Pandey et al., "Towards management of machine to machine networks", URL: http://141.223.82.74/papers/APNOMS/11/apnoms2011_suman.pdf, 13th Asia-Pacific, IEEE, Network Operations and Management Symposium (APNOMS), 2011, 7 pages.
Aijaz, Adnan, "Protocol Design for Machine-to-Machine Networks", Diss. King's College London (University of London), 2014, 196 pages.
Mir, Muhammad Waqas, "Perpetual battery life for Machine to Machine communication devices with cellular access", URL: https://aaltodoc.aalto.fi/bitstream/handle/123456789/10174/master_Mir_Muhammad_2013.pdf?sequence=1, Mar. 15, 2013, 74 pages.
Chen et al., "Machine-to-machine communications: Technologies and challenges", URL: http://santos ee.ntu.edu.tw/papers/2013/Machineto- machine%20communications%20Technologies%20and%20challenges.pdf., Ad Hoc Networks 18, 2014, 21 pages.
Lähetkangas et al., "On the Flexible 5G Dense Deployment Air Interface for Mobile Broadband", URL: https://www.metis2020.com/wp-content/uploads/publications/5GU_Conference_2014_L%C3A4hetkangas_etal_On_the_Flexible_5G_Dense_Deployment_Air_Interface.pdf. Nokia Networks Oulu, Finland, 2014, 5 pages.
Non-Final Office Action received for U.S. Appl. No. 15/355,222 dated Sep. 12, 2017, 22 pages.
Non-Final Office Action received for U.S. Appl. No. 15/899,695 dated Nov. 2, 2018, 30 pages.

* cited by examiner

ADVANCED SIGNALING PROCEDURE EXCLUSION IN A NEXT GENERATION 5G NETWORK

CROSS-REFERENCE TO RELATED APPLICATIONS

This patent application is a continuation of, and claims priority to each of, U.S. patent application Ser. No. 15/899,695, now U.S. Pat. No. 10,362,628, filed on Feb. 20, 2018, and entitled, "COMMUNICATION SERVICE FOR MACHINE-TO-MACHINE DEVICE," which is a continuation of U.S. patent application Ser. No. 15/355,222, now U.S. Pat. No. 9,936,536, filed on Nov. 18, 2016, and entitled, "COMMUNICATION SERVICE FOR MACHINE-TO-MACHINE DEVICE," which is a continuation of U.S. patent application Ser. No. 14/699,725, now U.S. Pat. No. 9,525,961, filed on Apr. 29, 2015, and entitled, "COMMUNICATION SERVICE FOR MACHINE-TO-MACHINE DEVICE". The entireties of these applications are hereby incorporated herein by reference.

TECHNICAL FIELD

The present application relates generally to providing communication service for a subscriber device according to different protocols in response to a determination that the subscriber device is a machine-to-machine (M2M) device.

BACKGROUND

The number of subscriber devices that connect to wireless networks has been growing at a very fast pace for many years. In the past, consumer purchase of manually-operated devices such as smart phones, tablets, etc. has driven the majority of the growth. However, a recent trend has started to emerge in which a different class of device is beginning to drive a significant proportion of the growth of subscriber devices that utilize wireless network services. Machine-to-machine devices such as smart meters, smart appliances, or the like, are not manually operated by a user when connecting to the network and communicating data but are increasingly becoming subscribers of wireless networks. It is expected that by the year 2020, M2M devices that use wireless network services will grow to the billions, possibly many hundreds of billions.

BRIEF DESCRIPTION OF THE DRAWINGS

Numerous aspects, embodiments, objects and advantages of the present invention will be apparent upon consideration of the following detailed description, taken in conjunction with the accompanying drawings, in which like reference characters refer to like parts throughout, and in which.

DETAILED DESCRIPTION

Overview

Figure 1:
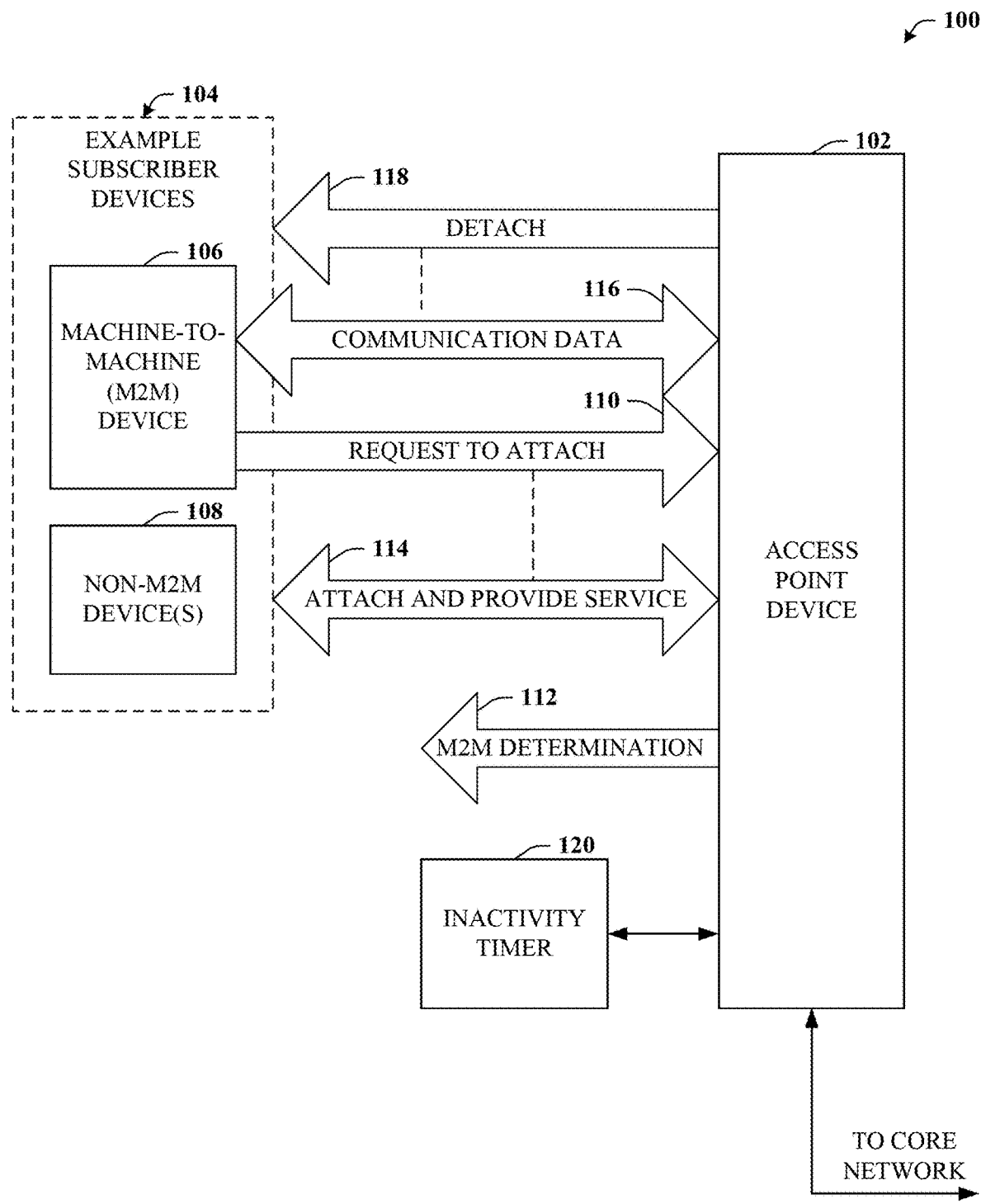
FIG. 1 illustrates a block diagram of an example system that can provide for enhanced machine-to-machine (M2M) communication service in accordance with certain embodiments of this disclosure.

Conventional mobile communication networks attempt to provide services to all subscriber devices that are provisioned to access a given service (e.g., a communication service). Such services are generally provided to a subscriber device in response to a request from the subscriber device to attach to the network. Managing services can be expensive in terms of resource utilization. For example, once the subscriber device is attached to the network, network devices of the communication network typically must manage the various states of each attached subscriber device, such as, e.g., UE idle or active state managed by eNB, mobility anchor state for all sessions managed by S-GW, IP anchor state for all sessions managed by P-GW, and mobility state, tracking area, and handover state of UE managed by MME, etc. Managing state information can be resource-intensive for many different network nodes, including serving gateways, packet data network gateways, and mobility management entities, all of which typically reside in the core network (CN) portion of the communication network. In addition, state information is sometimes also managed by access point devices or other devices that reside in the radio access network (RAN) portion of the communication network as stated in the examples above.

Unfortunately, conventional mobile communication networks are not especially scalable in terms of managing state information associated with attached subscriber devices. In this regard, the expected growth of machine-to-machine (M2M) devices in the near future will place additional stress on network components that those network components may not be able to handle in a cost-effective manner.

The disclosed subject matter relates to treating M2M devices (e.g., meter readers) as a special case when attaching and providing services, and to delivering services to M2M devices based on need, which is generally much lower than the needs of mobile phones or other manually operated user equipment. In some embodiments, an access point (AP) device (e.g., eNodeB, femtocell, etc.) can receive a request from a subscriber device to attach to the network. The AP device can determine that the subscriber device is an M2M device in one of several ways. Upon making this determination, the AP device can treat the communication session for the M2M device differently than communication sessions associated with other subscriber devices. For example, the AP device can receive communication data from the M2M device (e.g., typically a scheduled transmission and often a fixed amount of data) and/or send (e.g., often also scheduled) communication data to the M2M device. Thereafter, the AP device can immediately detach the M2M device without the need to wait for the expiration of an inactivity timer, thereby freeing up valuable resources that can be allocated to other devices.

It is understood that conventional communication networks employ inactivity timers to signal when to detach idle devices, which is very useful for mobile devices where inactivity is common. In those cases, allowing the attached device to stay attached, even when idle, can be more efficient than detaching the device as soon as it becomes idle, since signaling associated with establishing a connection (e.g., attaching) is relatively resource intensive. Hence, conventional communication networks allow a subscriber device to remain attached in an idle state as a trade-off to avoid repeatedly detaching and re-attaching the subscriber device that is in use by the operator, but happens to be idle for short periods of time.

While use of these inactivity times can be extremely useful for many subscriber devices, M2M devices generally do not come with the same uncertainty as to whether an idle period means the user is just temporarily idle or use of the network service is complete. In this regard, the disclosed subject matter can efficiently handle large numbers of M2M devices in an efficient manner Such can on average reduce signaling overhead as well as resource allocation for all devices attached to the network, particularly when a significant portion of the provisioned devices are M2M devices.

The disclosed subject matter can further reduce power requirements for M2M subscriber devices, which can be very advantageous not only for users associated with M2M devices, but also in terms of meeting the stringent battery life requirements defined by communication standards. For example, third generation partnership project (3GPP) standards require that M2M devices be equipped with batteries that will sufficiently power those devices for many years without replacement. In 5G, the M2M device required battery life is extended to 10 years or longer. By immediately detaching the M2M device after communication data is sent (without waiting on expiration of an inactivity time), power can be conserved at the M2M device. In addition, the AP device can furthermore conserve M2M power by excluding M2M devices from load balancing procedures or other procedures, as further detailed below.

Example Devices to Enhance M2M Communication Service

The disclosed subject matter is now described with reference to the drawings, wherein like reference numerals are used to refer to like elements throughout. In the following description, for purposes of explanation, numerous specific details are set forth in order to provide a thorough understanding of the disclosed subject matter. It may be evident, however, that the disclosed subject matter may be practiced without these specific details. In other instances, well-known structures and devices are shown in block diagram form in order to facilitate describing the disclosed subject matter.

Referring now to the drawing, with reference initially to FIG. 1, system 100 is depicted. System 100 can provide for enhanced machine-to-machine (M2M) communication service. The enhanced communication service provided to M2M devices can, e.g., reduce the amount of resources required to provide service to an M2M device and reduce the energy consumption by M2M devices when leveraging a communication network and/or the provided service(s). Generally, system 100 can comprise a processor and a memory that stores executable instructions that, when executed by the processor, facilitate performance of operations. Examples of the memory and processor can be found with reference to FIG. 11. It is to be appreciated that the computer 1102 can represent a server device of a communications network or a user equipment device and can be used in connection with implementing one or more of the systems or components shown and described in connection with FIG. 1 and other figures disclosed herein.

System 100 can include an access point (AP) device 102 that subscriber devices 104 utilize to access a communication network and/or services provided by the communication network. Examples of suitable AP devices 102 are provided in connection with FIG. 2B. Subscriber devices 104 can be substantially any device that can attach to a mobile communication network, via AP device 102. It is understood that the subject matter disclosed herein relates specifically to M2M devices, which are therefore a relevant subset of all subscriber devices. Other devices that can be considered subscriber devices 104, but are not M2M devices 106 are distinguished at reference numeral 108. These non-M2M devices 108 can also attach to AP device 102, and in a sense are competing for scarce resources with M2M devices 106, but can be considered for the sake of this disclosure to operate in a conventional manner when doing so. Examples of M2M devices 106 are depicted with reference to FIG. 2A.

AP device 102 can be configured to receive a request 110 to attach to the communication network via AP device 102. Request 110 can be received from M2M device 106, which, as discussed above, can be a subset of potential subscriber devices 104. In response to request 110, AP device 102 can attach M2M device 106 by providing communication network service for M2M device 106. Attaching and providing service to M2M device 106 is illustrated by reference numeral 114. At some point before, during, or shortly after attaching and providing service 114, AP device 102 can determine that the subscriber device 104 making request 110 is an M2M device 106, a special subset of all subscriber devices 104. The determination that request 110 is made by M2M device 106 is depicted as M2M determination 112. M2M determination 112 can be determined in numerous ways, various examples of which are further described with reference to FIG. 3.

Once M2M device 106 is attached, communication data 116 can be received from the M2M device 106, or in some embodiments transmitted to M2M device 106. After the last byte of communication data 116 has been delivered, an inactivity timer 120 can be started, since the device has communicated the data as intended and can be marked as idle. In conventional systems, this idle state may be updated by various network elements, but M2M device 106 will remain attached and therefore continue to tie up allocated resources. This situation remains until an inactivity timer 120 expires (which also requires allocated resources to operate), at which point, M2M device 106 can be detached.

According to the disclosed subject matter, however, upon receiving communication data 116, AP device 102 can immediately detach (element 118) M2M device 106 by terminating communication network service for M2M device. Detach 118 procedure can be effectuated independently of inactivity timer 120 that triggers detachment after expiration of an inactivity timer in conventional systems. It is understood that in cases where request 110 is made by non-M2M device 108 (and/or subscriber device 104 is not determined to be an M2M device), then detaching can occur as normal after expiration of inactivity timer 120. But in the special case of subscriber device 104 being determined to be an M2M device 106, then detach 118 procedure can implemented immediately without regard to inactivity timer 120. In some embodiments, inactivity timer 120 need not be used at all (thereby reducing resource utilization) in response to M2M determination 112. In some embodiments, certain states (e.g., an idle state identifier) need not be updated in response to M2M determination 112.

Figure 2A:
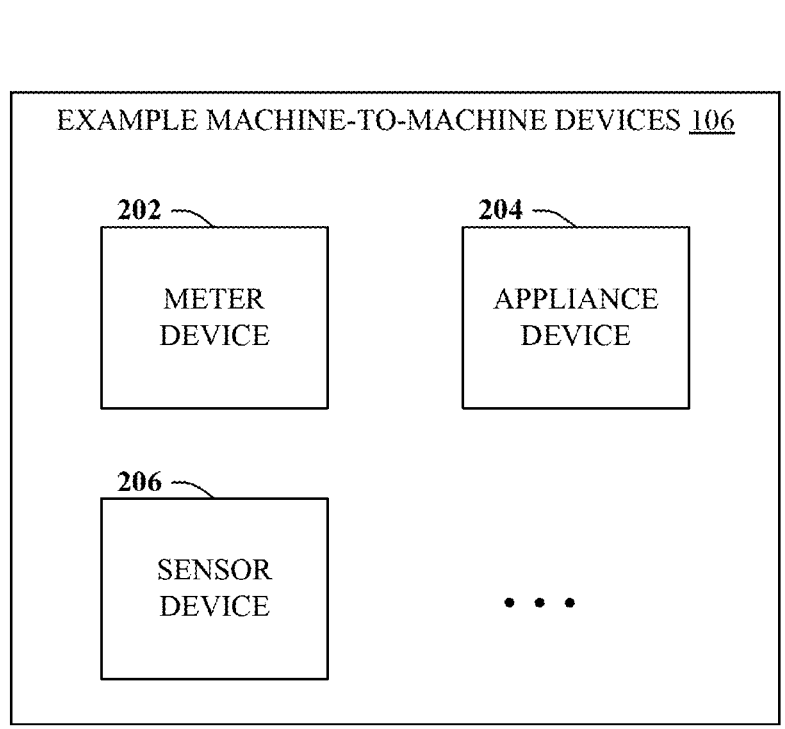
FIG. 2A illustrates a block diagram illustration of several suitable examples of the M2M device in accordance with certain embodiments of this disclosure.
Figure 2B:
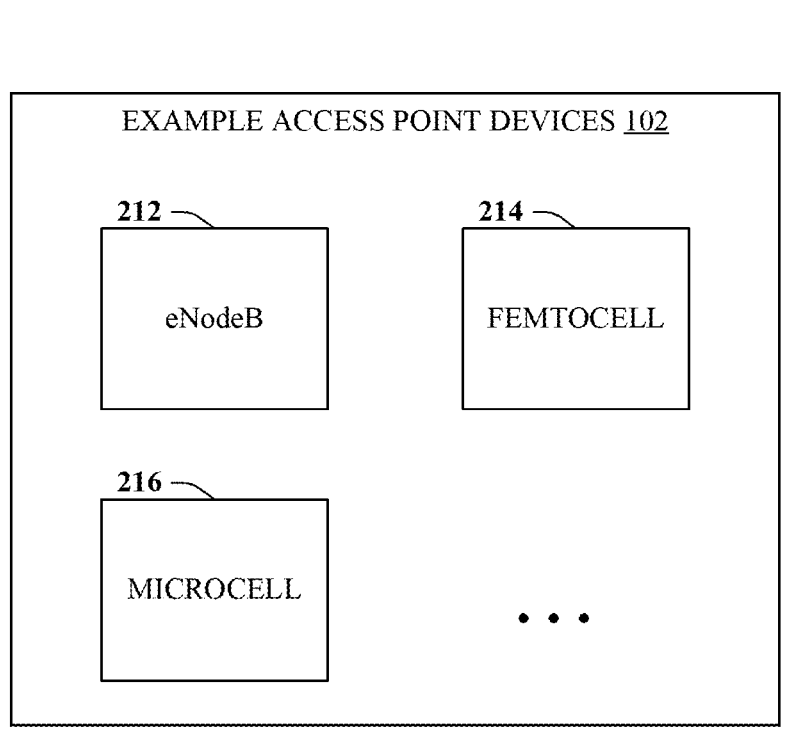
FIG. 2B illustrates a block diagram illustration of various examples of the access point device in accordance with certain embodiments of this disclosure.

While still referring to FIG. 1, but turning now as well to FIGS. 2A and 2B, illustrations 200 and 210 are depicted. Illustration 200 provides for several suitable examples of the M2M device 106. M2M devices 106 generally have certain characteristics that distinguish from other subscriber devices 104 such as non-M2M devices 108. For example, M2M devices 106 generally transmit request 110 and/or communication data 116 without manual instruction or an expectation of manual direction, potentially for the life of the device. Unlike most non-M2M devices 108 that must contend with mobility, M2M devices 106, at least those relevant to the disclosed subject matter, are generally stationary. In some embodiments, M2M devices 106 generally only transmit request 110 and/or communication data 116 according to a defined schedule, which are referred to herein as scheduled stationary machine-to-machine (SS-M2M) devices.

An example of a suitable M2M device 106 is meter device 202. For example, a smart meter that monitors or measures resource consumption at a designated site or premises. Meter device 202 serves as an example of an SS-M2M device, since meter device 202 is both stationary and may only need to use the communication network according to a defined schedule (e.g., once per month to send consumption data). Another example of a suitable M2M device 106 is appliance device 204. Appliance device 104 can be, e.g., a smart refrigerator that, via sensors, determines when certain goods are in short supply and utilizes the communication network to transmit appropriate messages. These messages can be scheduled (e.g., provided to a grocery delivery service or the owner's cell phone as a shopping list once per week) or event-driven (e.g., provided in response to the short supply). Still another example of a suitable M2M device 106 is sensor device 206. In some embodiments, sensor device 206 can sense or measure a physical attribute or quantity. As with appliance device 204, sensor device 206 use of the communication network can be either scheduled or event-driven, but devices 204 and 206 will generally be stationary.

In some embodiments, various tiers of service can be provisioned to M2M devices 106 based on the type of M2M device 106 in question or designated service requirements. For example, an SS-M2M device such as meter device 202 that does not have mobility requirements (e.g., is stationary) and only attaches to the network about once per month to send meter data (e.g., operates on a defined schedule and has a relatively small data usage) might be provisioned at a very low tier that is less expensive and less resource-intensive on the network than higher tiers. Another provision tier can apply to, for example, appliance device 204 that sends only scheduled messages that certain goods are in short supply. This type of M2M device is scheduled and the data usage is small, but the frequency of use is likely higher than for meter device 202 (e.g., scheduled data transmitted once per week vs. once per month), so such might invoke a higher provisioning tier. As another example, a third provisioning tier can be provided when M2M device 106 is not scheduled, but rather event-driven. Appliance device 204 provides an example here as well, but rather than sending notices once per week as in the previous example, the notices can be provided as needed and driven by the event of short supply, for example. This type of M2M device is not scheduled, which may increase the network demands, but data usage can be intermittent and the device is stationary, which can reduce network demands. As still another example, consider sensor device 206 that gathers a large amount of data and seeks to transmit that data daily as well as based on events. This type of M2M device is not necessarily scheduled, the schedules are relatively frequent, and the data usage is high. Thus, this M2M device might be provisioned at a higher tier than the other examples. As can be seen by these examples, provisioning an M2M device based on usage/need can be affected by a variety of factors, many of which are influenced by the demands such usage places on the communication network. Examples factors can be, e.g., whether usage is scheduled or event-based, frequency of use, data usage and so forth. It is appreciated, however, that most M2M device usage will generally be far less resource-intensive on the communication network than the average non-M2M device 108, so provisioning tiers for M2M device 106 can be especially advantageous for those customers.

Referring specifically to FIG. 2B, illustration 210 can provide for various examples of the access point device 102. For example, AP device 102 can be eNodeB 212, femtocell 214, or microcell 216. It is understood that examples provided herein are for the sake of illustration and not intended to be exhaustive or limiting.

Figure 3:
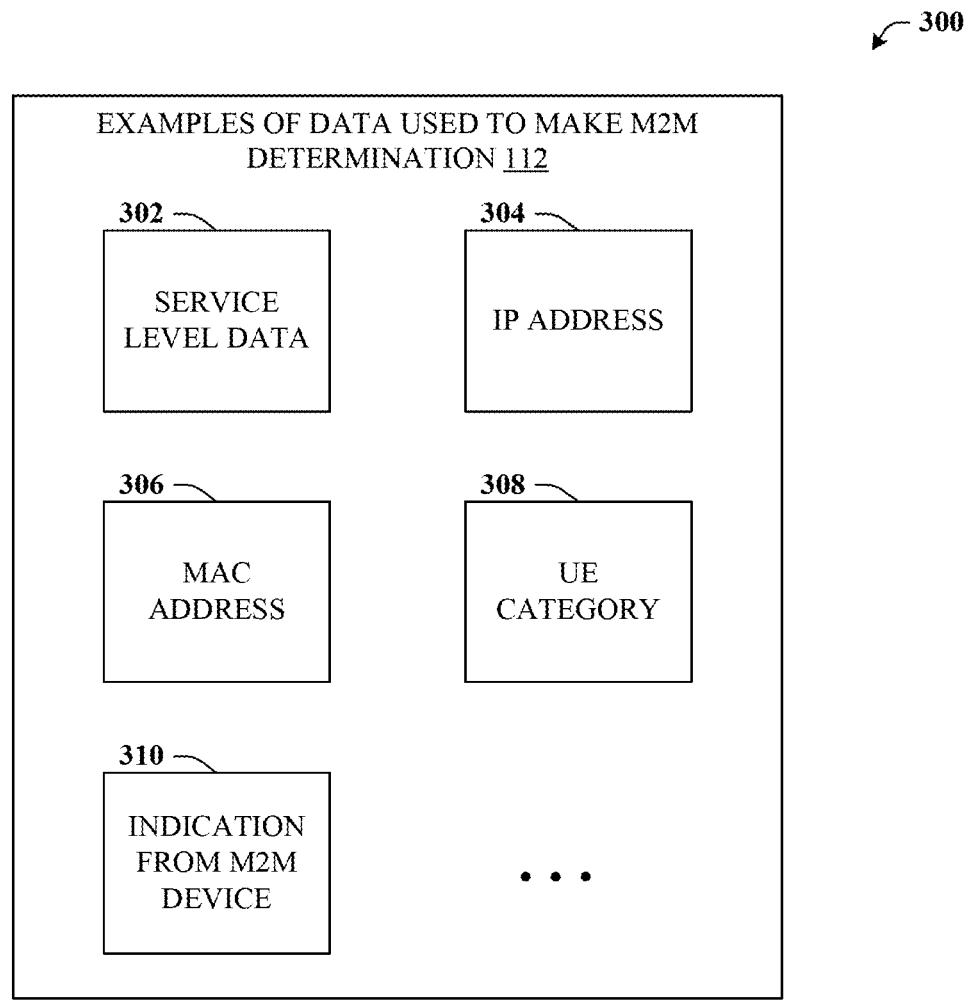
FIG. 3 illustrates a block diagram illustration of several examples of data that can be used to make the M2M determination in accordance with certain embodiments of this disclosure.

Referring now to FIG. 3, illustration 300 is depicted. Illustration 300 provides for several examples of data that can be used to make the M2M determination 112. For example, determining the subscriber device 104 is a machine-to-machine device 106 can be based on any of the following. Service level data 302, Internet protocol (IP) address 304, media access control (MAC) address 306, user equipment (UE) category 308, indication 310 from M2M device 106, and so forth. Service level data 302 can relate to provisioned service level data representative of a level of service provisioned for the subscriber device 104 by an entity of the communication network. IP address 304 can relate to an IP address associated with the subscriber device 104. MAC address 306 can relate to a media access control address associated with the subscriber device 104. UE category 308 can relate to user equipment category data representative of a device category as defined by a third generation partnership project specification or by another entity. Indication 310 can relate to machine-to-machine identification data received from the subscriber device 104 that indicates the subscriber device 104 is a machine-to-machine device 106.

Figure 4:
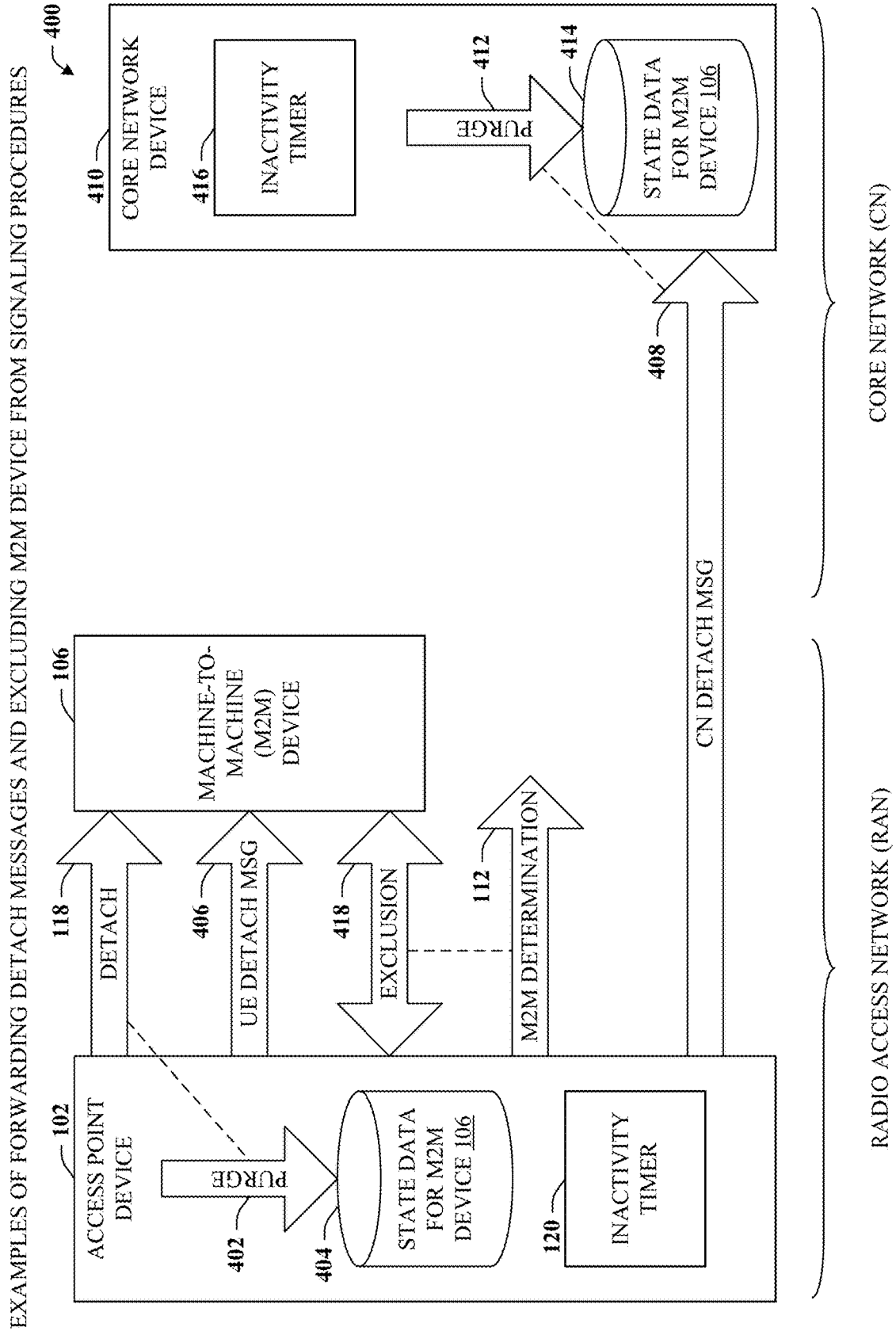
FIG. 4 illustrate a block diagram of an example system that depicts examples related to forwarding detach messages and to excluding M2M devices from certain signaling procedures in accordance with certain embodiments of this disclosure.

Turning now to FIG. 4, system 400 is provided. System 400 depicts examples related to forwarding detach messages and to excluding M2M devices from certain signaling procedures. System 400 assumes M2M device 106 has already attached to the communication network via AP device 102 and has completed transmission of communication data 116, upon which AP device 102 will typically immediately detach M2M device 106 independently of inactivity timer 120. In some embodiments, AP device 102 can purge 402 state data 404 associated with a mobility state of M2M device 106 that is managed by or accessibly to AP device 102. Purging of state data 404 can be in response to detach 118 procedure and can be independent of inactivity timer 120.

In some embodiments, AP device 102 can transmit UE detachment message 406 to M2M device 106. UE detachment message 406 can relate to an indication that M2M device 106 has been detached. Not all embodiments rely on the use of UE detachment message 406 as in some embodiments, M2M device 106 has knowledge that M2M devices are being treated differently and is aware in advance to detach/power down after communication data 116 is transmitted. For other embodiments, however, UE detachment message 406 can serve to conserve power for M2M device 106 instead of remaining in a power-using, though idle, state.

In some embodiments, AP device 102 can transmit a CN detachment message 408 to a core network device 410. Core network device 410 can be, for example, a serving gateway device, a packet data network (PDN) gateway device, a mobility management entity (MME) device or any suitable device that manages or maintains resource directed to the attachment of M2M device 106 such as state data 414 or inactivity timer 416. CN detachment message can include information indicative of the detach 118 procedure and/or indicative of purging 412 of the device state information 414 associated with the attaching of the machine-to-machine device 106 and independently of the inactivity timer 416. In this regard, resources can be saved due to the immediate detachment of M2M device 106 in both the core network as well as the radio access network of the communication network.

Furthermore, additional power-saving mechanisms can be provided. For instance, in some embodiments, AP device 102 can provide for exclusion 418. Exclusion 418 can relate to excluding M2M device 106 from various signaling procedures such as load-balancing procedures. Since load-balancing procedures generally require a significant amount of measurements and reporting, excluding M2M devices 106 from these processes can result in a significant power-consumption savings. Moreover, given that M2M devices 106 typically will not benefit from certain load-balancing operations, as their spectrum requirements are usually quite minimal, excluding M2M devices 106 from such procedures will not generally negatively impact the advantageous associated with those procedures.

Figure 5:
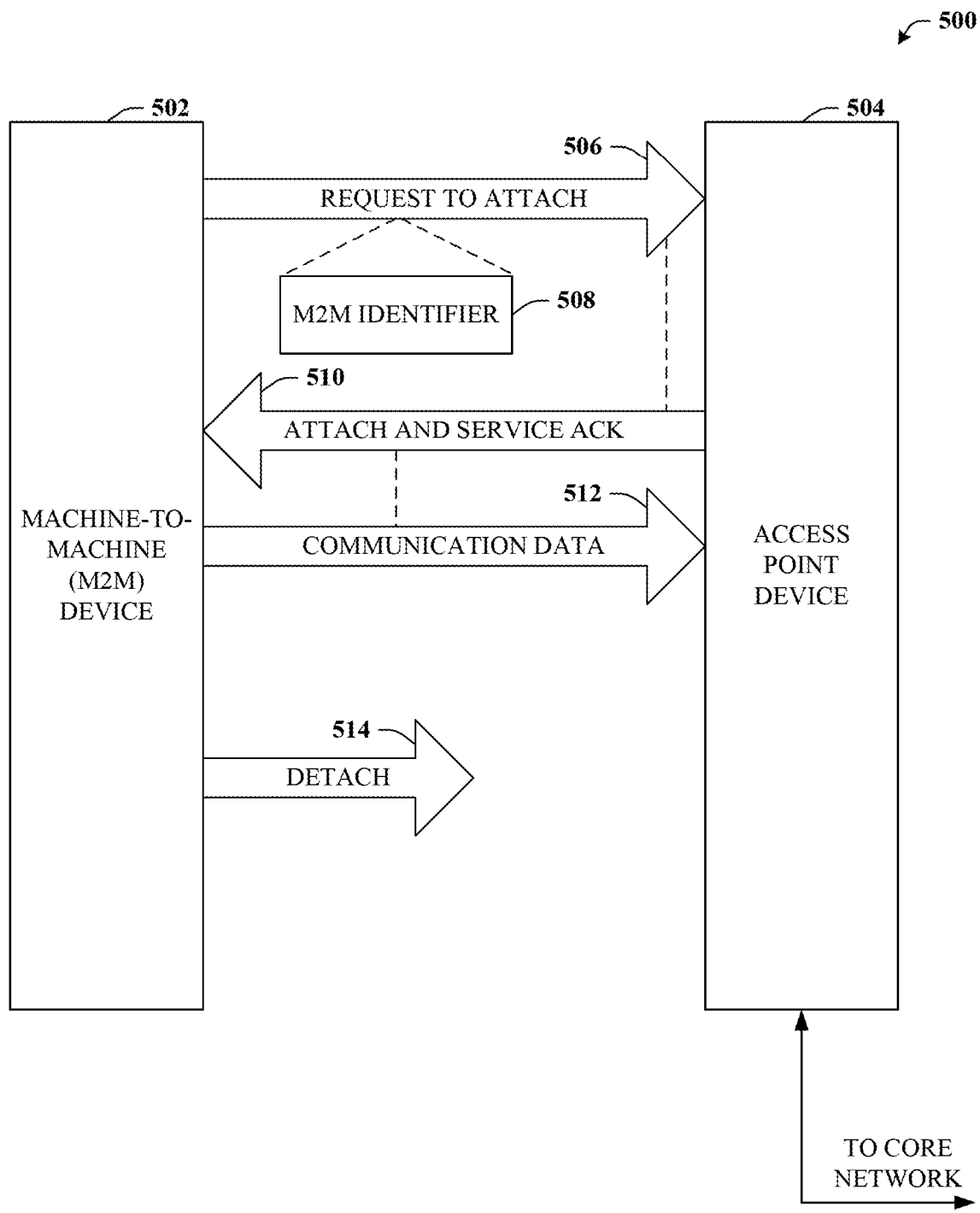
FIG. 5 illustrates a block diagram of an example system that provides a subscriber-side implementation in connection with enhanced M2M communication in accordance with certain embodiments of this disclosure.

Referring now to FIG. 5, system 500 is depicted. System 500 provides a subscriber-side implementation in connection with enhanced M2M communication. While examples provided with respect to FIGS. 1-4 (e.g., network-side implementations) may in some regards be more efficient in operation, such also may require certain changes to be made to network elements. Embodiments illustrated in FIGS. 5 and 6 can be implemented with fewer or no changes to existing infrastructure. For example, rather than (or in addition to) AP device 102 determining that a subscriber device 104 is a M2M device 106, the M2M device in question can indicate as much and facilitate detachment at the appropriate time.

System 500 can include M2M device 502 and AP device 504, which can function in much the same way as previously described in connection with FIG. 1. For example, M2M device 502 can transmit a request 506 to AP device 504. Request 502 can be a request to attach to the communication network via, AP device 504. In response, AP device 504 can attach M2M device 502 and provide the request service and M2M device 502 can be informed by acknowledgement 510. M2M device 502 can further transmit to AP device 504 M2M identifier 508 that indicated the request to attach is for a machine-to-machine device. M2M identifier 508 can be transmitted with request 506 or as part of a separate message. M2M identifier 508 can be based on examples provided herein in connection with FIG. 3 and is intended to inform AP device 504 of the status of device 502 as an M2M device and thus that upon completion of transmission of communication data 512, the communication session can be terminated immediately without waiting on expiration of an inactivity timer.

Hence, in response receiving acknowledgement 510 that the M2M device 502 is attached to the communication network via AP device 504, M2M device 502 can transmit communication data 512 to AP device 504. Upon completion of the transmitting of the communication data 512, M2M device 502 can detach 514 from the communication network by terminating a communication network service provided by AP device 504 independently of an inactivity timer that triggers detaching after expiration of an inactivity period.

Figure 6:
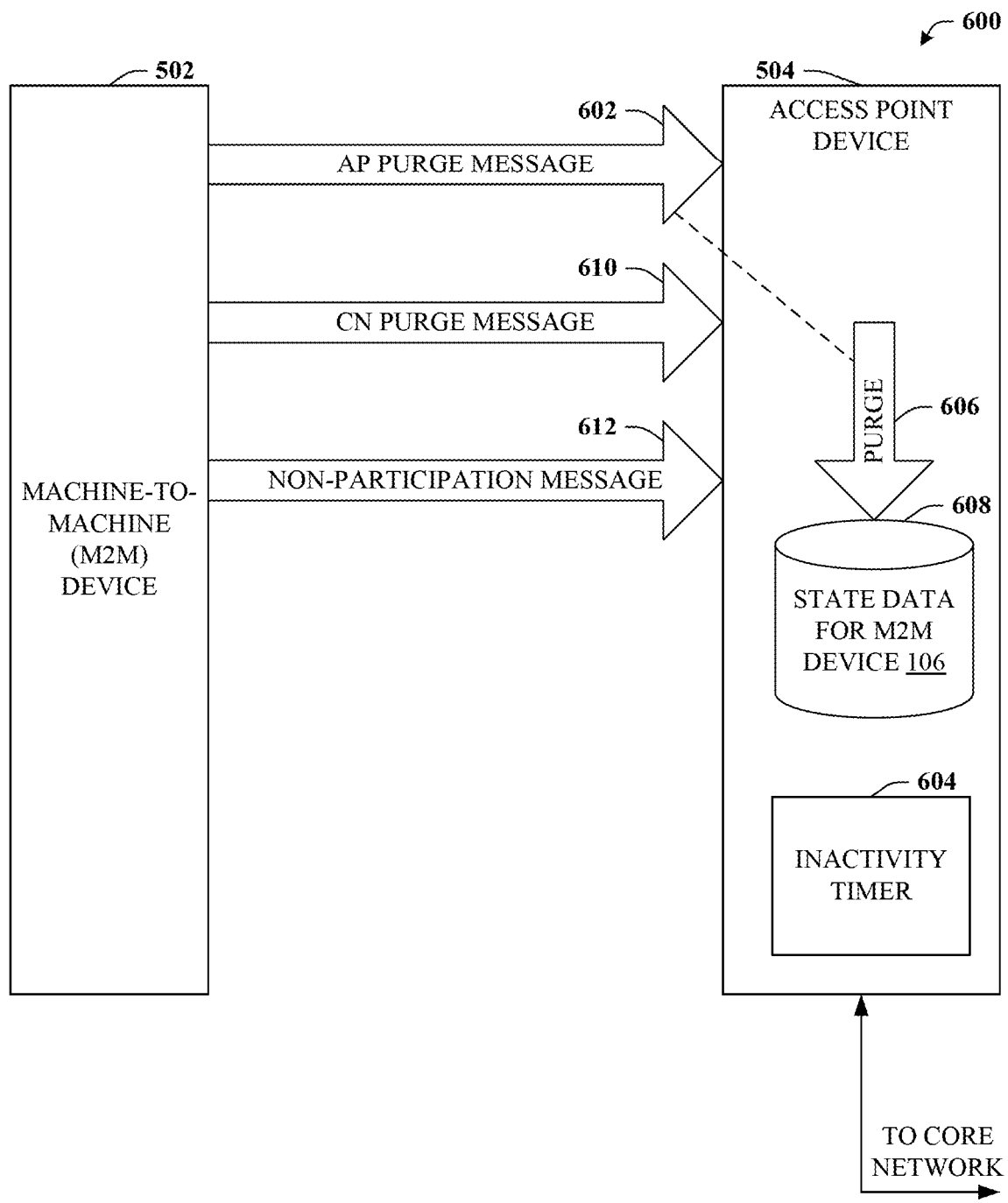
FIG. 6 illustrates a block diagram of an example system that depicts additional aspects or elements in connection with the subscriber-side implementation in accordance with certain embodiments of this disclosure.

Turning now to FIG. 6, system 600 is provided. System 600 illustrates additional aspects or elements in connection with a device-side implementation. In some embodiments, M2M device 502 can transmit to the AP device 504 an AP purge message 602. AP purge message 602 can instruct AP device 504 to purge 606 state information 608 associated with the attaching of M2M device 502 and to do so independently of the inactivity timer.

In some embodiments, M2M device 502 can transmit to the AP device 504 CN purge message 610. CN purge message 610 can instruct a device of the core network (e.g., an SGW device, PGW device, MME device, etc.) to purge state information associated with the attaching of M2M device 502 and to do so independently of the inactivity timer. CN purge message 610 can be forwarded to the appropriate core network device(s) by AP device 504.

In some embodiments, M2M device 502 can transmit to the AP device 504 non-participation message 612. Non-participation message 612 can instruct AP device 504 that M2M device 502 is to be excluded from participation in signaling operations such as load-balancing signaling operations.

Example Methods to Enhance M2M Communication Service

Figure 7:
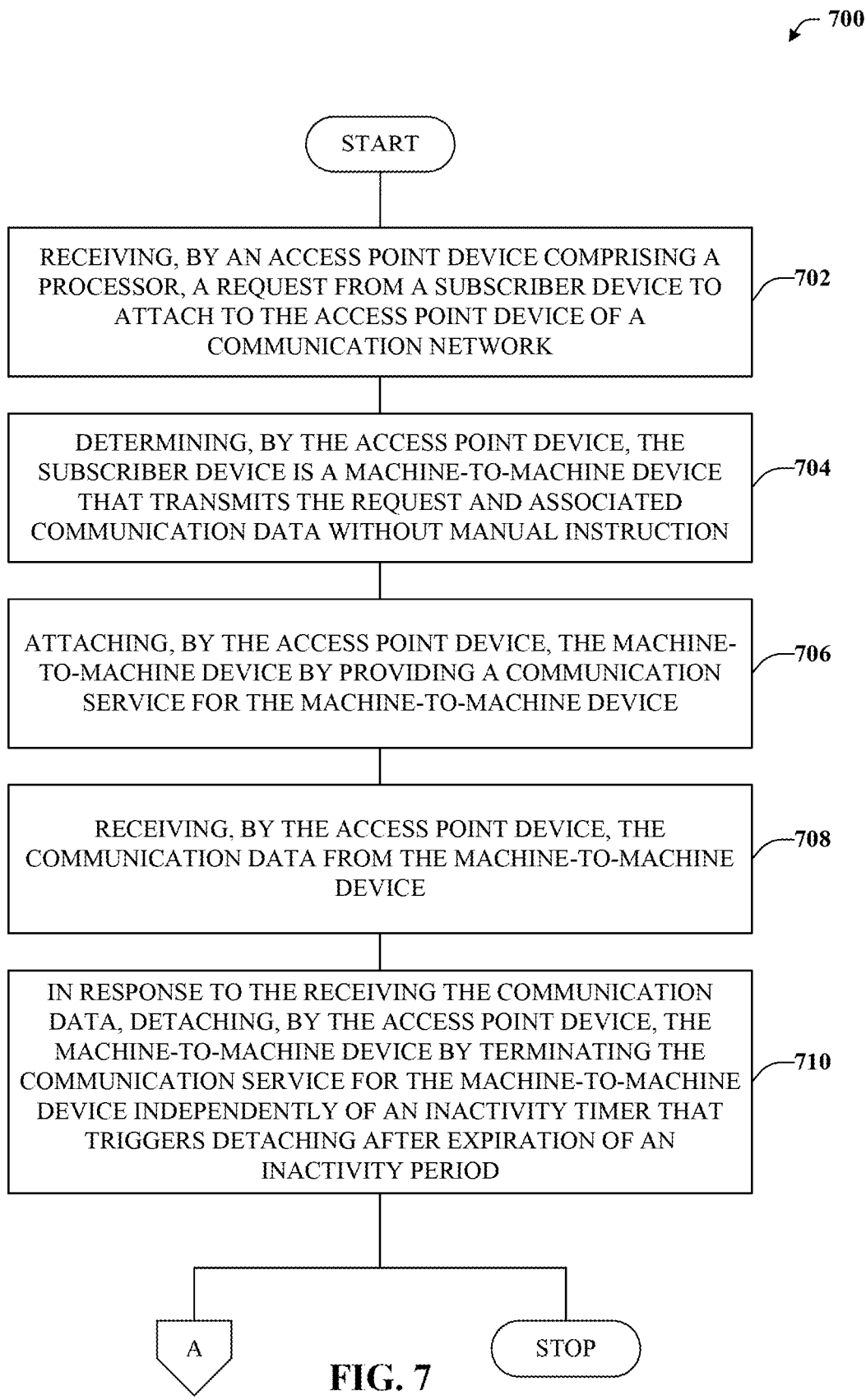
FIG. 7 illustrates an example methodology that can provide for enhanced machine-to-machine communication service in accordance with certain embodiments of this disclosure.
Figure 8:
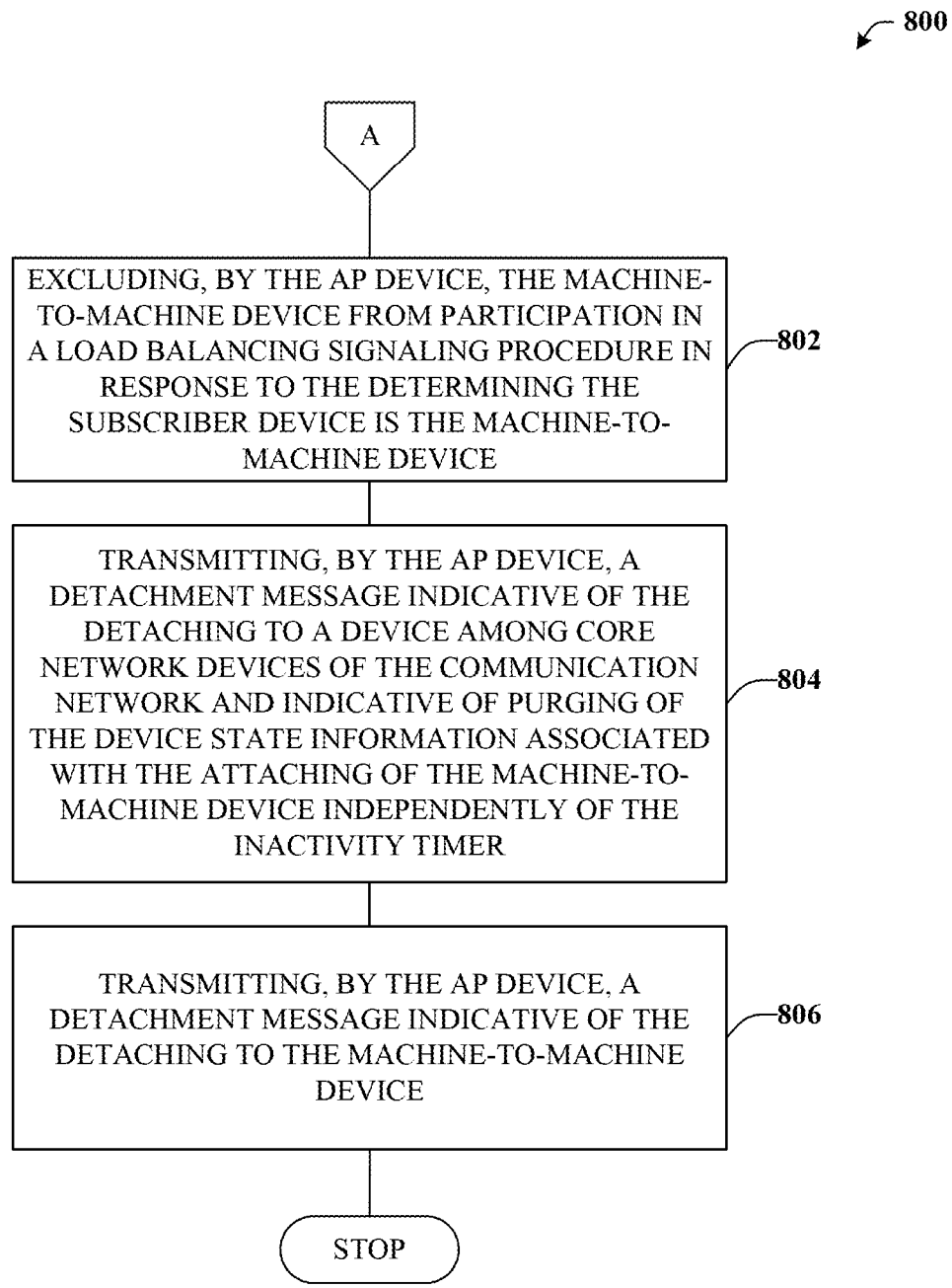
FIG. 8 illustrates an example methodology that can provide for additional elements or aspects in connection with enhanced machine-to-machine communication service in accordance with certain embodiments of this disclosure.

FIGS. 7 and 8 illustrate various methodologies in accordance with the disclosed subject matter. While, for purposes of simplicity of explanation, the methodologies are shown and described as a series of acts, it is to be understood and appreciated that the disclosed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the disclosed subject matter. Additionally, it should be further appreciated that the methodologies disclosed hereinafter and throughout this specification are capable of being stored on an article of manufacture to facilitate transporting and transferring such methodologies to computers.

Turning now to FIG. 7, exemplary method 700 is depicted. Method 700 can provide for enhanced machine-to-machine communication service. For example, at reference numeral 702, an access point device comprising a processor can receive a request from a subscriber device to attach to the access point device of a communication network.

At reference numeral 704, the access point device can determine the subscriber device is a machine-to-machine device that transmits the request (e.g., the request received at reference numeral 702) and associated communication data (e.g., communication data received at reference numeral 708) without manual instruction.

At reference numeral 706, the access point device can attach the machine-to-machine device to the communication network by providing a communication service for the machine-to-machine device. At reference numeral 708, the access point device can receive the communication data from the machine-to-machine device.

At reference numeral 710, in response to the receiving the communication data (e.g., at reference numeral 708), the access point device can detach the machine-to-machine device by terminating the communication service for the machine-to-machine device independently of an inactivity timer that triggers detaching after expiration of an inactivity period. Method 700 can proceed to insert A, which is further detailed in connection with FIG. 8, or end.

With reference now to FIG. 8, exemplary method 800 is illustrated. Method 800 can provide for additional elements or aspects in connection with enhanced machine-to-machine communication service. For example, at reference numeral 802, the access point device can exclude the machine-to-machine device from participation in a load balancing signaling procedure or another signaling procedure. Such an exclusion can be in response to the determining the subscriber device is a M2M device, for instance at reference numeral 704 of FIG. 7. Excluding the M2M device from such procedures can reduce energy-consumption and facilitate increased battery life.

At reference numeral 804, the AP device can transmit a detachment message indicative of the detaching detailed at reference numeral 710 of FIG. 7. The detachment message can be provided to a device among core network devices of the communication network. The detachment message can instruct the device to purge device state information associated with the attaching of the M2M device and to do so independently of an inactivity timer. At reference numeral 806, the AP device can transmit a detachment message indicative of the detaching. In this case, the detachment message can be provided to the M2M device rather than to the core network device as detailed at reference numeral 806. It is understood that the detachment message detailed at reference numeral 804 can facilitate more efficient use of core network resources, whereas the detachment message detailed at reference numeral 806 can facilitate reduced power consumption by the M2M device.

Example Operating Environments

Figure 9:
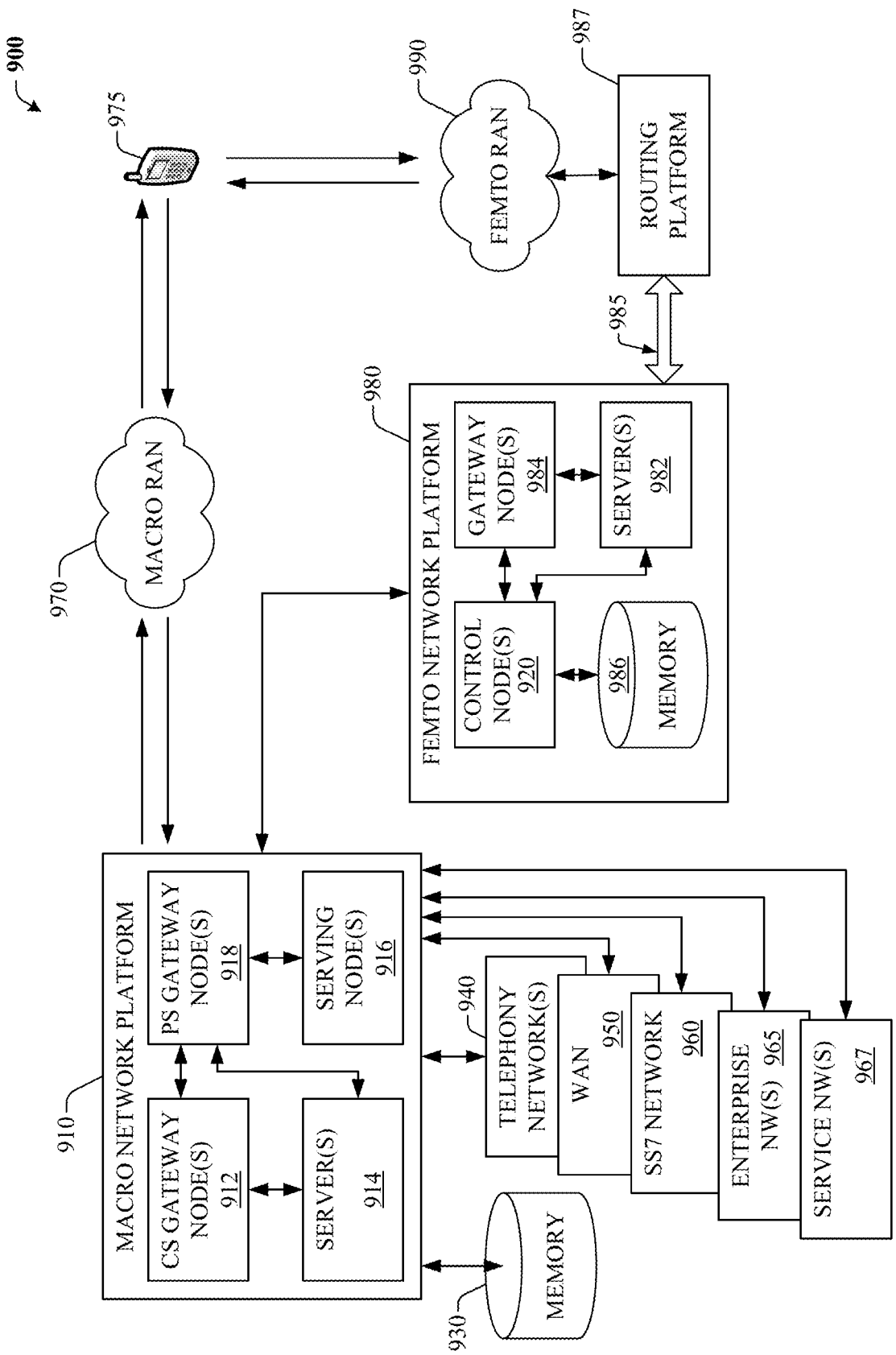
FIG. 9 illustrates a first example of a wireless communications environment with associated components that can be operable to execute certain embodiments of this disclosure.

To provide further context for various aspects of the subject specification, FIG. 9 illustrates an example wireless communication environment 900, with associated components that can enable operation of a femtocell enterprise network in accordance with aspects described herein. Wireless communication environment 900 comprises two wireless network platforms: (i) A macro network platform 910 that serves, or facilitates communication) with user equipment 975 via a macro radio access network (RAN) 970. It should be appreciated that in cellular wireless technologies (e.g., 4G, 3GPP UMTS, HSPA, 3GPP LTE, 3GPP UMB, 5G), macro network platform 910 is embodied in a Core Network. (ii) A femto network platform 980, which can provide communication with UE 975 through a femto RAN 990, linked to the femto network platform 980 through a routing platform 910 via backhaul pipe(s) 985. It should be appreciated that femto network platform 980 typically off-loads UE 975 from macro network, once UE 975 attaches (e.g., through macro-to-femto handover, or via a scan of channel resources in idle mode) to femto RAN.

It is noted that RAN comprises base station(s), or access point(s), and its associated electronic circuitry and deployment site(s), in addition to a wireless radio link operated in accordance with the base station(s). Accordingly, macro RAN 970 can comprise various coverage cells, while femto RAN 990 can comprise multiple femto access points or multiple metro cell access points. As mentioned above, it is to be appreciated that deployment density in femto RAN 990 can be substantially higher than in macro RAN 970.

Generally, both macro and femto network platforms 910 and 980 comprise components, e.g., nodes, gateways, interfaces, servers, or platforms, that facilitate both packet-switched (PS) (e.g., internet protocol (IP), Ethernet, frame relay, asynchronous transfer mode (ATM)) and circuit-switched (CS) traffic (e.g., voice and data) and control generation for networked wireless communication. In an aspect of the subject innovation, macro network platform 910 comprises CS gateway node(s) 912 which can interface CS traffic received from legacy networks like telephony network(s) 940 (e.g., public switched telephone network (PSTN), or public land mobile network (PLMN)) or a SS7 network 960. Circuit switched gateway 912 can authorize and authenticate traffic (e.g., voice) arising from such networks. Additionally, CS gateway 912 can access mobility, or roaming, data generated through SS7 network 960; for instance, mobility data stored in a VLR, which can reside in memory 930. Moreover, CS gateway node(s) 912 interfaces CS-based traffic and signaling and gateway node(s) 918. As an example, in a 3GPP UMTS network, gateway node(s) 918 can be embodied in gateway GPRS support node(s) (GGSN).

In addition to receiving and processing CS-switched traffic and signaling, gateway node(s) 918 can authorize and authenticate PS-based data sessions with served (e.g., through macro RAN) wireless devices. Data sessions can comprise traffic exchange with networks external to the macro network platform 910, like wide area network(s) (WANs) 950; it should be appreciated that local area network(s) (LANs) can also be interfaced with macro network platform 910 through gateway node(s) 918. Gateway node(s) 918 generates packet data contexts when a data session is established. To that end, in an aspect, gateway node(s) 918 can comprise a tunnel interface (e.g., tunnel termination gateway (TTG) in 3GPP UMTS network(s); not shown) which can facilitate packetized communication with disparate wireless network(s), such as Wi-Fi networks. It should be further appreciated that the packetized communication can comprise multiple flows that can be generated through server(s) 914. It is to be noted that in 3GPP UMTS network(s), gateway node(s) 918 (e.g., GGSN) and tunnel interface (e.g., TTG) comprise a packet data gateway (PDG).

Macro network platform 910 also comprises serving node(s) 916 that convey the various packetized flows of information or data streams, received through gateway node(s) 918. As an example, in a 3GPP UMTS network, serving node(s) can be embodied in serving GPRS support node(s) (SGSN).

As indicated above, server(s) 914 in macro network platform 910 can execute numerous applications (e.g., location services, online gaming, wireless banking, wireless device management . . . ) that generate multiple disparate packetized data streams or flows, and manage (e.g., schedule, queue, format . . . ) such flows. Such application(s), for example can comprise add-on features to standard services provided by macro network platform 910. Data streams can be conveyed to gateway node(s) 918 for authorization/ authentication and initiation of a data session, and to serving node(s) 916 for communication thereafter. Server(s) 914 can also effect security (e.g., implement one or more firewalls) of macro network platform 910 to ensure network's operation and data integrity in addition to authorization and authentication procedures that CS gateway node(s) 912 and gateway node(s) 918 can enact. Moreover, server(s) 914 can provision services from external network(s), e.g., WAN 950, or Global Positioning System (GPS) network(s) (not shown). It is to be noted that server(s) 914 can comprise one or more processor configured to confer at least in part the functionality of macro network platform 910. To that end, the one or more processor can execute code instructions stored in memory 930, for example.

In example wireless environment 900, memory 930 stores information related to operation of macro network platform 910. Information can comprise business data associated with subscribers; market plans and strategies, e.g., promotional campaigns, business partnerships; operational data for mobile devices served through macro network platform; service and privacy policies; end-user service logs for law enforcement; and so forth. Memory 930 can also store information from at least one of telephony network(s) 940, WAN(s) 950, or SS7 network 960, enterprise NW(s) 965, or service NW(s) 967.

Femto gateway node(s) 984 have substantially the same functionality as PS gateway node(s) 918. Additionally, femto gateway node(s) 984 can also comprise substantially all functionality of serving node(s) 916. In an aspect, femto gateway node(s) 984 facilitates handover resolution, e.g., assessment and execution. Further, control node(s) 920 can receive handover requests and relay them to a handover component (not shown) via gateway node(s) 984. According to an aspect, control node(s) 920 can support RNC capabilities.

Server(s) 982 have substantially the same functionality as described in connection with server(s) 914. In an aspect, server(s) 982 can execute multiple application(s) that provide service (e.g., voice and data) to wireless devices served through femto RAN 990. Server(s) 982 can also provide security features to femto network platform. In addition, server(s) 982 can manage (e.g., schedule, queue, format . . . ) substantially all packetized flows (e.g., IP-based) it generates in addition to data received from macro network platform 910. It is to be noted that server(s) 982 can comprise one or more processor configured to confer at least in part the functionality of macro network platform 910. To that end, the one or more processor can execute code instructions stored in memory 986, for example.

Memory 986 can comprise information relevant to operation of the various components of femto network platform 980. For example operational information that can be stored in memory 986 can comprise, but is not limited to, subscriber information; contracted services; maintenance and service records; femto cell configuration (e.g., devices served through femto RAN 990; access control lists, or white lists); service policies and specifications; privacy policies; add-on features; and so forth.

It is noted that femto network platform 980 and macro network platform 910 can be functionally connected through one or more reference link(s) or reference interface(s). In addition, femto network platform 980 can be functionally coupled directly (not illustrated) to one or more of external network(s) 940, 950, 960, 965 or 967. Reference link(s) or interface(s) can functionally link at least one of gateway node(s) 984 or server(s) 986 to the one or more external networks 940, 950, 960, 965 or 967.

Figure 10:
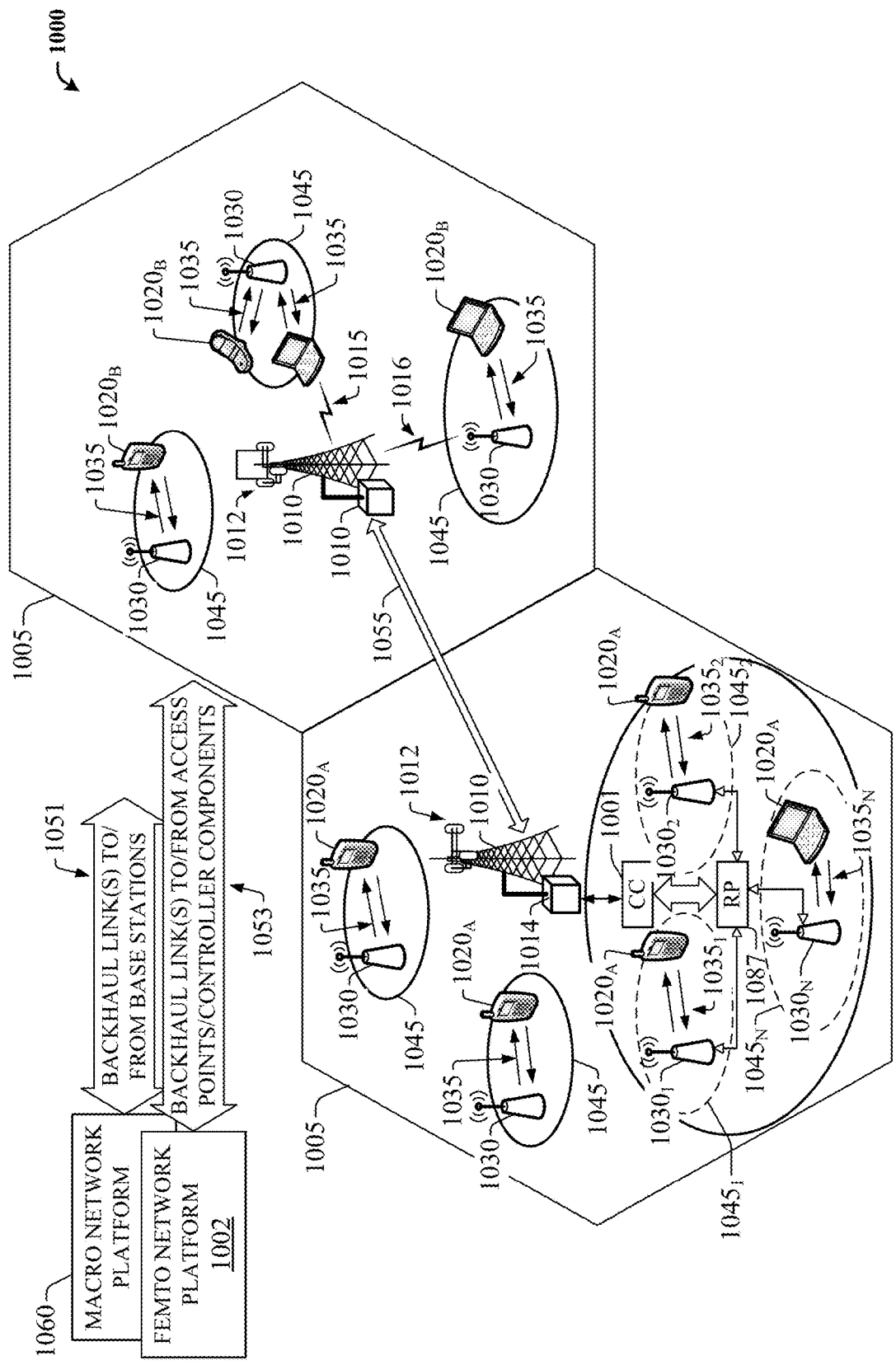
FIG. 10 illustrates a second example of a wireless communications environment with associated components that can be operable to execute certain embodiments of this disclosure.

FIG. 10 illustrates a wireless environment that comprises macro cells and femtocells for wireless coverage in accordance with aspects described herein. In wireless environment 1005, two areas represent "macro" cell coverage; each macro cell is served by a base station 1010. It can be appreciated that macro cell coverage area 1005 and base station 1010 can comprise functionality, as more fully described herein, for example, with regard to system 1000. Macro coverage is generally intended to serve mobile wireless devices, like UE $1020_A$, $1020_B$, in outdoors locations. An over-the-air (OTA) wireless link 1035 provides such coverage, the wireless link 1035 comprises a downlink (DL) and an uplink (UL), and utilizes a predetermined band, licensed or unlicensed, of the radio frequency (RF) spectrum. As an example, UE $1020_A$, 1020E can be a 3GPP Universal Mobile Telecommunication System (UMTS) mobile phone. It is noted that a set of base stations, its associated electronics, circuitry or components, base stations control component(s), and wireless links operated in accordance to respective base stations in the set of base stations form a radio access network (RAN). In addition, base station 1010 communicates via backhaul link(s) 1051 with a macro network platform 1060, which in cellular wireless technologies (e.g., 3rd Generation Partnership Project (3GPP) Universal Mobile Telecommunication System (UMTS), Global System for Mobile Communication (GSM)) represents a core network.

In an aspect, macro network platform 1060 controls a set of base stations 1010 that serve either respective cells or a number of sectors within such cells. Base station 1010 comprises radio equipment 1014 for operation in one or more radio technologies, and a set of antennas 1012 (e.g., smart antennas, microwave antennas, satellite dish(es) . . . ) that can serve one or more sectors within a macro cell 1005. It is noted that a set of radio network control node(s), which can be a part of macro network platform 1060; a set of base stations (e.g., Node B 1010) that serve a set of macro cells 1005; electronics, circuitry or components associated with the base stations in the set of base stations; a set of respective OTA wireless links (e.g., links 1015 or 1016) operated in accordance to a radio technology through the base stations; and backhaul link(s) 1055 and 1051 form a macro radio access network (RAN). Macro network platform 1060 also communicates with other base stations (not shown) that serve other cells (not shown). Backhaul link(s) 1051 or 1053 can comprise a wired backbone link (e.g., optical fiber backbone, twisted-pair line, T1/E1 phone line, a digital subscriber line (DSL) either synchronous or asynchronous, an asymmetric ADSL, or a coaxial cable . . . ) or a wireless (e.g., line-of-sight (LOS) or non-LOS) backbone link. Backhaul pipe(s) 1055 link disparate base stations 1010. According to an aspect, backhaul link 1053 can connect multiple femto access points 1030 and/or controller components (CC) 1001 to the femto network platform 1002. In one example, multiple femto APs can be connected to a routing platform (RP) 1087, which in turn can be connect to a controller component (CC) 1001. Typically, the information from UEs $1020_A$ can be routed by the RP 1087, for example, internally, to another UE $1020_A$ connected to a disparate femto AP connected to the RP 1087, or, externally, to the femto network platform 1002 via the CC 1001, as discussed in detail supra.

In wireless environment 1005, within one or more macro cell(s) 1005, a set of femtocells 1045 served by respective femto access points (APs) 1030 can be deployed. It can be appreciated that, aspects of the subject innovation can be geared to femtocell deployments with substantive femto AP density, e.g., $10^4$-$10^7$ femto APs 1030 per base station 1010. According to an aspect, a set of femto access points $1030_1$-$1030_N$, with N a natural number, can be functionally connected to a routing platform 1087, which can be functionally coupled to a controller component 1001. The controller component 1001 can be operationally linked to the femto network platform 1002 by employing backhaul link(s) 1053. Accordingly, UE $1020_A$ connected to femto APs $1030_1$-$1030_N$ can communicate internally within the femto enterprise via the routing platform (RP) 1087 and/or can also communicate with the femto network platform 1002 via the RP 1087, controller component 1001 and the backhaul link(s) 1053. It can be appreciated that although only one femto enterprise is depicted in FIG. 10, multiple femto enterprise networks can be deployed within a macro cell 1005.

It is noted that while various aspects, features, or advantages described herein have been illustrated through femto access point(s) and associated femto coverage, such aspects and features also can be exploited for home access point(s) (HAPs) that provide wireless coverage through substantially any, or any, disparate telecommunication technologies, such as for example Wi-Fi (wireless fidelity) or picocell telecommunication. Additionally, aspects, features, or advantages of the subject innovation can be exploited in substantially any wireless telecommunication, or radio, technology; for example, Wi-Fi, Worldwide Interoperability for Microwave Access (WiMAX), Enhanced General Packet Radio Service (Enhanced GPRS), 3GPP LTE, 3GPP2 UMB, 3GPP UMTS, HSPA, HSDPA, HSUPA, or LTE Advanced. Moreover, substantially all aspects of the subject innovation can comprise legacy telecommunication technologies.

With respect to FIG. 10, in example embodiment 1000, base station AP 1010 can receive and transmit signal(s) (e.g., traffic and control signals) from and to wireless devices, access terminals, wireless ports and routers, etc., through a set of antennas $1012_1$-$1012_N$. It should be appreciated that while antennas $1012_1$-$1012_N$ are a part of communication platform 1025, which comprises electronic components and associated circuitry that provides for processing and manipulating of received signal(s) (e.g., a packet flow) and signal(s) (e.g., a broadcast control channel) to be transmitted. In an aspect, communication platform 1025 comprises a transmitter/receiver (e.g., a transceiver) 1066 that can convert signal(s) from analog format to digital format upon reception, and from digital format to analog format upon transmission. In addition, receiver/transmitter 1066 can divide a single data stream into multiple, parallel data streams, or perform the reciprocal operation. Coupled to transceiver 1066 is a multiplexer/demultiplexer 1067 that facilitates manipulation of signal in time and frequency space. Electronic component 1067 can multiplex information (data/traffic and control/signaling) according to various multiplexing schemes such as time division multiplexing (TDM), frequency division multiplexing (FDM), orthogonal frequency division multiplexing (OFDM), code division multiplexing (CDM), space division multiplexing (SDM). In addition, mux/demux component 1067 can scramble and spread information (e.g., codes) according to substantially any code known in the art; e.g., Hadamard-Walsh codes, Baker codes, Kasami codes, polyphase codes, and so on. A modulator/demodulator 1068 is also a part of operational group 1025, and can modulate information according to multiple modulation techniques, such as frequency modulation, amplitude modulation (e.g., M-ary quadrature amplitude modulation (QAM), with M a positive integer), phase-shift keying (PSK), and the like.

Figure 11:
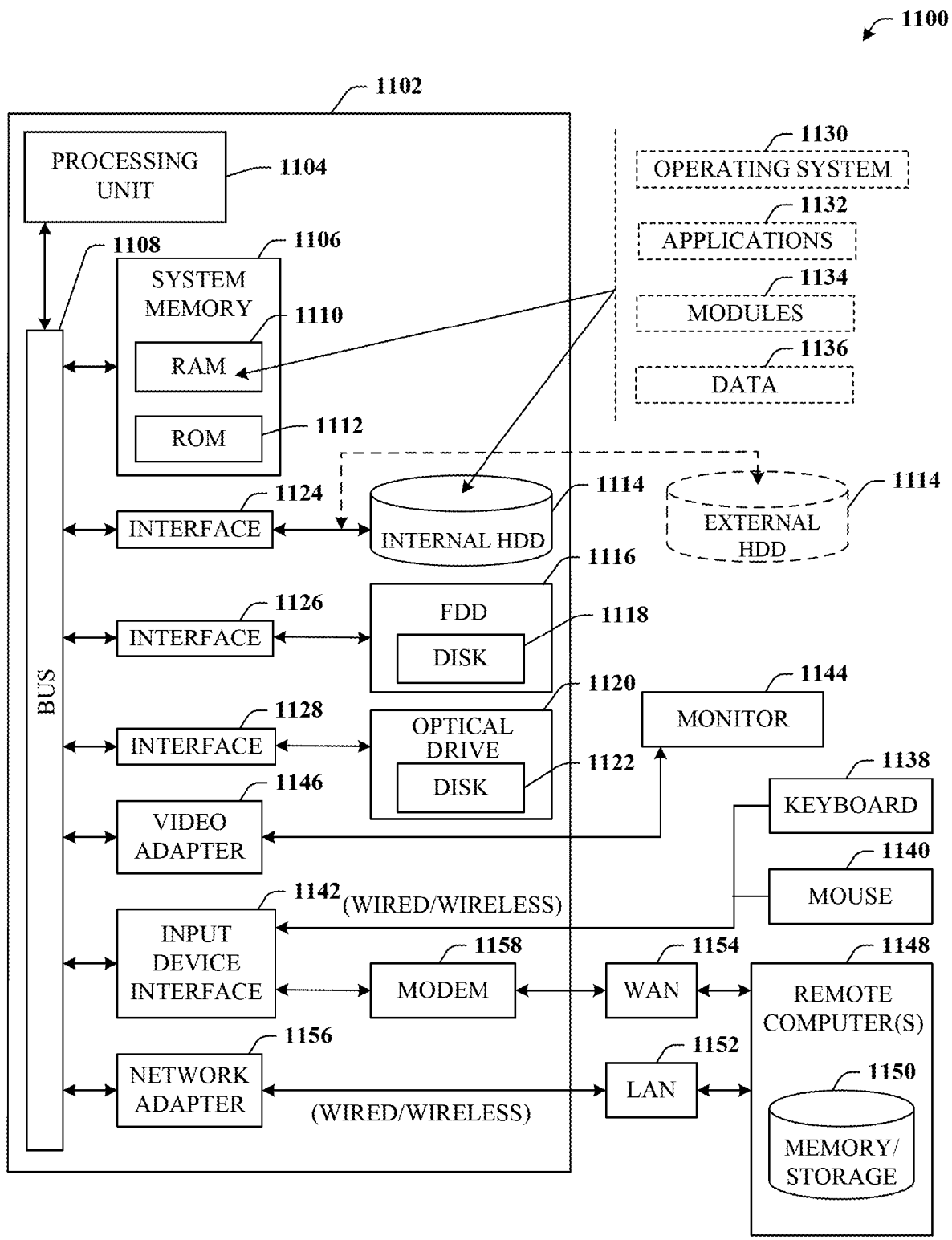
FIG. 11 illustrates an example block diagram of a computer operable to execute certain embodiments of this disclosure.

Referring now to FIG. 11, there is illustrated a block diagram of an exemplary computer system operable to execute the disclosed architecture. In order to provide additional context for various aspects of the disclosed subject matter, FIG. 11 and the following discussion are intended to provide a brief, general description of a suitable computing environment 1100 in which the various aspects of the disclosed subject matter can be implemented. Additionally, while the disclosed subject matter described above may be suitable for application in the general context of computer-executable instructions that may run on one or more computers, those skilled in the art will recognize that the disclosed subject matter also can be implemented in combination with other program modules and/or as a combination of hardware and software.

Generally, program modules comprise routines, programs, components, data structures, etc., that perform particular tasks or implement particular abstract data types. Moreover, those skilled in the art will appreciate that the inventive methods can be practiced with other computer system configurations, including single-processor or multi-processor computer systems, minicomputers, mainframe computers, as well as personal computers, hand-held computing devices, microprocessor-based or programmable consumer electronics, and the like, each of which can be operatively coupled to one or more associated devices.

The illustrated aspects of the disclosed subject matter may also be practiced in distributed computing environments where certain tasks are performed by remote processing devices that are linked through a communications network. In a distributed computing environment, program modules can be located in both local and remote memory storage devices.

A computer typically comprises a variety of computer-readable media. Computer-readable media can be any available media that can be accessed by the computer and comprises both volatile and nonvolatile media, removable and non-removable media. By way of example, and not limitation, computer-readable media can comprise computer storage media and communication media. Computer storage media can comprise either volatile or nonvolatile, removable and non-removable media implemented in any method or technology for storage of information such as computer-readable instructions, data structures, program modules or other data. Computer storage media comprises, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and comprises any information delivery media. The term "modulated data signal" means a signal that has one or more of its characteristics set or changed in such a manner as to encode information in the signal. By way of example, and not limitation, communication media comprises wired media such as a wired network or direct-wired connection, and wireless media such as acoustic, RF, infrared and other wireless media. Combinations of the any of the above should also be included within the scope of computer-readable media.

Still referring to FIG. 11, the exemplary environment 1100 for implementing various aspects of the disclosed subject matter comprises a computer 1102, the computer 1102 including a processing unit 1104, a system memory 1106 and a system bus 1108. The system bus 1108 couples to system components including, but not limited to, the system memory 1106 to the processing unit 1104. The processing unit 1104 can be any of various commercially available processors. Dual microprocessors and other multi-processor architectures may also be employed as the processing unit 1104.

The system bus 1108 can be any of several types of bus structure that may further interconnect to a memory bus (with or without a memory controller), a peripheral bus, and a local bus using any of a variety of commercially available bus architectures. The system memory 1106 comprises read-only memory (ROM) 1110 and random access memory (RAM) 1112. A basic input/output system (BIOS) is stored in a non-volatile memory 1110 such as ROM, EPROM, EEPROM, which BIOS contains the basic routines that help to transfer information between elements within the computer 1102, such as during start-up. The RAM 1112 can also comprise a high-speed RAM such as static RAM for caching data.

The computer 1102 further comprises an internal hard disk drive (HDD) 1114 (e.g., EIDE, SATA), which internal hard disk drive 1114 may also be configured for external use in a suitable chassis (not shown), a magnetic floppy disk drive (FDD) 1116, (e.g., to read from or write to a removable diskette 1118) and an optical disk drive 1120, (e.g., reading a CD-ROM disk 1122 or, to read from or write to other high capacity optical media such as the DVD). The hard disk drive 1114, magnetic disk drive 1116 and optical disk drive 1120 can be connected to the system bus 1108 by a hard disk drive interface 1124, a magnetic disk drive interface 1126 and an optical drive interface 1128, respectively. The interface 1124 for external drive implementations comprises at least one or both of Universal Serial Bus (USB) and IEEE1394 interface technologies. Other external drive connection technologies are within contemplation of the subject matter disclosed herein.

The drives and their associated computer-readable media provide nonvolatile storage of data, data structures, computer-executable instructions, and so forth. For the computer 1102, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the disclosed subject matter.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. It is appreciated that the disclosed subject matter can be implemented with various commercially available operating systems or combinations of operating systems.

A user can enter commands and information into the computer 1102 through one or more wired/wireless input devices, e.g., a keyboard 1138 and a pointing device, such as a mouse 1140. Other input devices (not shown) may comprise a microphone, an IR remote control, a joystick, a game pad, a stylus pen, touch screen, or the like. These and other input devices are often connected to the processing unit 1104 through an input device interface 1142 that is coupled to the system bus 1108, but can be connected by other interfaces, such as a parallel port, an IEEE1394 serial port, a game port, a USB port, an IR interface, etc.

A monitor 1144 or other type of display device is also connected to the system bus 1108 via an interface, such as a video adapter 1146. In addition to the monitor 1144, a computer typically comprises other peripheral output devices (not shown), such as speakers, printers, etc.

The computer 1102 may operate in a networked environment using logical connections via wired and/or wireless communications to one or more remote computers, such as a remote computer(s) 1148. The remote computer(s) 1148 can be a workstation, a server computer, a router, a personal computer, a mobile device, portable computer, microprocessor-based entertainment appliance, a peer device or other common network node, and typically comprises many or all of the elements described relative to the computer 1102, although, for purposes of brevity, only a memory/storage device 1150 is illustrated. The logical connections depicted comprise wired/wireless connectivity to a local area network (LAN) 1152 and/or larger networks, e.g., a wide area network (WAN) 1154. Such LAN and WAN networking environments are commonplace in offices and companies, and facilitate enterprise-wide computer networks, such as intranets, all of which may connect to a global communications network, e.g., the Internet.

When used in a LAN networking environment, the computer 1102 is connected to the local network 1152 through a wired and/or wireless communication network interface or adapter 1156. The adapter 1156 may facilitate wired or wireless communication to the LAN 1152, which may also comprise a wireless access point disposed thereon for communicating with the wireless adapter 1156.

When used in a WAN networking environment, the computer 1102 can comprise a modem 1158, or is connected to a communications server on the WAN 1154, or has other means for establishing communications over the WAN 1154, such as by way of the Internet. The modem 1158, which can be internal or external and a wired or wireless device, is connected to the system bus 1108 via the serial port interface 1142. In a networked environment, program modules depicted relative to the computer 1102, or portions thereof, can be stored in the remote memory/storage device 1150. It will be appreciated that the network connections shown are exemplary and other means of establishing a communications link between the computers can be used.

The computer 1102 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This comprises at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 11 Mbps (802.11b) or 54 Mbps (802.11a) data rate, for example, or with products that contain both bands (dual band), so the networks can provide real-world performance similar to the basic "10BaseT" wired Ethernet networks used in many offices.

What has been described above comprises examples of the various embodiments. It is, of course, not possible to describe every conceivable combination of components or methodologies for purposes of describing the embodiments, but one of ordinary skill in the art may recognize that many further combinations and permutations are possible. Accordingly, the detailed description is intended to embrace all such alterations, modifications, and variations that fall within the spirit and scope of the appended claims.

As used in this application, the terms "system," "component," "interface," and the like are generally intended to refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. These components also can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry that is operated by software or firmware application(s) executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. An interface can comprise input/output (I/O) components as well as associated processor, application, and/or API components.

Furthermore, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from by a computing device.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory. In addition, memory components or memory elements can be removable or stationary. Moreover, memory can be internal or external to a device or component, or removable or stationary. Memory can comprise various types of media that are readable by a computer, such as hard-disc drives, zip drives, magnetic cassettes, flash memory cards or other types of memory cards, cartridges, or the like.

By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In this regard, it will also be recognized that the embodiments comprises a system as well as a computer-readable medium having computer-executable instructions for performing the acts and/or events of the various methods.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communications media comprise wired media, such as a wired network or direct-wired connection, and wireless media such as acoustic, RF, infrared and other wireless media Further, terms like "user equipment," "user device," "mobile device," "mobile," "station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

What is claimed is:

1. An access point device, comprising:
   a processor; and
   a memory that stores executable instructions that, when executed by the processor, facilitate performance of operations, comprising:
   determining that a signaling procedure is to be performed with respect to a group of subscriber devices served by the access point device;
   based on a device type, determining that a first device, from among the group of subscriber devices, is a member of an excluded class; and
   excluding the first device from the signaling procedure that is performed with respect to other members of the group of subscriber devices.

2. The access point device of claim 1, wherein the signaling procedure comprises instructing the other members to perform measurements and to report results of the measurements to the access point device.

3. The access point device of claim 1, wherein the signaling procedure is a load-balancing procedure.

4. The access point device of claim 1, wherein the device type of the first device is a machine-to-machine device and the excluded class comprises machine-to-machine device types that are determined to operate without manual instruction.

5. The access point device of claim 1, wherein the device type of the first device is a stationary device and the excluded class comprises stationary device types that are determined to operate without changes to a physical location.

6. The access point device of claim 1, wherein the device type of the first device is a scheduled device and the excluded class comprises scheduled device types that attach to the access point device according to a defined schedule.

7. The access point device of claim 1, wherein the operations further comprise determining the device type of the first device based on provisioned service level data representative of a level of service provisioned for the first device.

8. The access point device of claim 1, wherein the operations further comprise determining the device type of the first device based on an Internet protocol address of the first device.

9. The access point device of claim 1, wherein the operations further comprise determining the device type of the first device based on a media access control address of the first device.

10. The access point device of claim 1, wherein the operations further comprise determining the device type of the first device based on user equipment category data representative of a device category defined by a third generation partnership project specification.

11. The access point device of claim 1, wherein the operations further comprise determining the device type of the first device based on excluded class identification data received from the first device that indicates the first device is at least one of: a machine-to-machine device determined to operate without manual instruction, a stationary device determined to operate without changes to a physical location, a scheduled device that attaches to the access point device according to a defined schedule, or a combination of the machine-to-machine device, the stationary device, or the scheduled device.

12. The access point device of claim 1, wherein the operations further comprise determining that the excluding causes a battery of the first device to meet a battery life constraint of a fifth generation (5G) specification of third generation partnership project.

13. A non-transitory machine-readable medium, comprising executable instructions that, when executed by a processor of an access point device, facilitate performance of operations, comprising:
  determining that a signaling procedure is to be performed with respect to a group of subscriber devices served by the access point device;
  based on a device type, determining that a first device, from among the group of subscriber devices, is a member of an excluded class; and
  performing the signaling procedure in connection with the group of subscriber devices, while excluding the first device from the signaling procedure.

14. The non-transitory machine-readable medium of claim 13, wherein the signaling procedure is a load-balancing procedure.

15. The non-transitory machine-readable medium of claim 13, wherein the device type of the first device is a machine-to-machine device that is determined to operate without manual instruction.

16. The non-transitory machine-readable medium of claim 15, wherein the device type of the first device is a stationary scheduled machine-to-machine device that is determined to be stationary in operation and to interact with the access point device according to a defined schedule.

17. A method, comprising:
  determining, by a device comprising a processor, that a signaling procedure is to be performed with respect to an access point device and a group of subscriber devices served by the access point device;
  based on a device type, determining, by the device, that a first device, from among the group of subscriber devices, is a member of an excluded class; and
  indicating, by the device, that the first device is to be excluded from the signaling procedure.

18. The method of claim 17, further comprising transmitting, by the device, identifier data that identifies the first device as a machine-to-machine device type.

19. The method of claim 17, further comprising determining, by the device, the device type of the first device based on at least one of: provisioned service level data representative of a level of service provisioned for the first device by, an Internet protocol address associated with the first device, a media access control address associated with the first device, user equipment category data representative of a device category as defined by a third generation partnership project specification, or machine-to-machine identification data received from the first device that indicates the first device is a machine-to-machine device.

20. The method of claim 17, further comprising, determining, by the device, that the excluding the first device from the signaling procedure causes a battery of the first device to meet a battery life constraint of a fifth generation (5G) wireless third generation partnership project specification.

* * * * *